(No Model.)
J. C. BAUER & J. P. FEYEREISEN.
DISK HARROW.
No. 523,508.        Patented July 24, 1894.
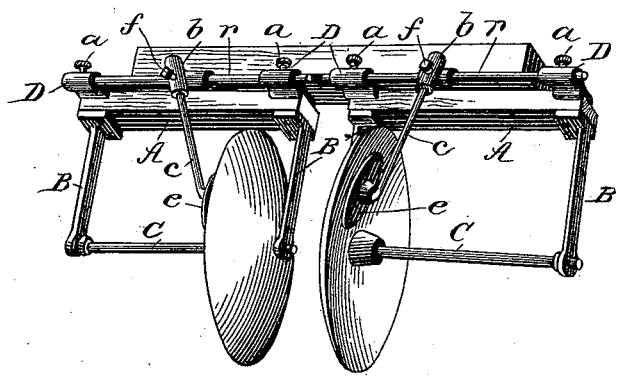
WITNESSES:
Jos. A. Ryan
Edw. W. Byrn
INVENTOR
John C. Bauer
J. P. Feyereisen
BY
Munn & Co.
ATTORNEYS.

UNITED STATES PATENT OFFICE.

JOHN C. BAUER AND JOHN P. FEYEREISEN, OF REMSEN, IOWA.

DISK HARROW.

SPECIFICATION forming part of Letters Patent No. 523,508, dated July 24, 1894.

Application filed October 1, 1892. Serial No. 447,557. (No model.)

*To all whom it may concern:*

Be it known that we, JOHN C. BAUER and JOHN P. FEYEREISEN, of Remsen, in the county of Plymouth and State of Iowa, have invented a new and useful Improvement in Disk Harrows, of which the following is a specification.

Our invention is in the nature of an improvement in disk harrows or pulverizers of that class which employs gangs of rotary disks arranged to run upon the ground and break up the clods into fine particles; and a set of small disks with suitable supports for holding these smaller disks against the sides of the larger ones for the purpose of scouring and cleaning the larger disks of the adhering earth, thus lightening the draft for the team, and also rendering the action of the pulverizing disks much more effective.

Our invention consists in the peculiar means for supporting and adjusting these scouring disks, as hereinafter fully described.

The figure is a perspective view of a part of a disk harrow with two main disks and two of the supplementary cleaning disks applied.

In the drawing A A represent the two supporting beams of a disk harrow, having hanger bars B depending therefrom and carrying at their lower ends the horizontal shafts C. Upon these shafts are arranged the two series of rotary disks, dished or concaved and disposed in two gangs as usual. As all the disks of the two gangs are similarly equipped we have only shown one main disk for each gang.

In suitable brackets or keepers D D bolted to the supporting beams A A there are fixed by screws *a a* two supporting rods parallel to the axes of the disks, and upon these rods *r* are arranged socket blocks *b* in which are retained shanks *c* whose lower ends are bent at right angles and have journaled upon them smaller supplementary disks *e*. These shanks with their disks are adjustable by set screws *f*. There is a socket block *b*, shank *c* and supplementary disk *e* for each one of the main disks, and the shanks are disposed at an angle that allows each supplementary disk to enter the hollow side of its main disk and impinge with its periphery at an acute angle against the side of the main disk.

Now as the main disks revolve from contact with the earth, they rotate the supplementary disks in a reverse direction to that of the main disks, and this serves to scour and scrape the main disks, dislodging and cleaning off the adhering mud and sticky earth that may adhere to the same, and thus not only lightening the draft on the team, but also rendering the action of the disks very much more effective in penetrating the earth and breaking up and pulverizing the clods. By raising or lowering the shanks and readjusting them by means of the set screws *f* the supplementary disks may be adjusted to the main disks to suit the nature of the soil.

In rendering our invention more distinctive we would state that in our invention the long shanks *c* of the scouring disks, and the socket blocks *b* permit the scouring disks to be adjusted vertically so that the said scouring disks may be adjusted close down to the lower edges of the main disks and to one side or below their axles, where they dislodge the earth at such points as do not allow it to drop onto and foul the axle, and which vertical adjustment also permits the scouring disks to be adjusted closer to or farther from the center of the main disks so as to vary the speed of the scouring disks according to the nature of the soil.

Having thus described our invention, what we claim as new, and desire to secure by Letters Patent, is—

The combination with the main disks in a disk harrow; of supplemental scouring disks *e* having the long carrying shanks *c*, socket blocks *b* with inclined holes through them to receive the shanks and set screws *f* for holding and adjusting the same, and a supporting rod *r* arranged parallel to the axle and carrying the socket blocks substantially as and for the purpose described.

JOHN C. BAUER.
J. P. FEYEREISEN.

Witnesses:
JOHN P. KIEFFER,
NICK THILL.